US009921966B2

(12) United States Patent
Krishnaiyer et al.

(10) Patent No.: US 9,921,966 B2
(45) Date of Patent: Mar. 20, 2018

(54) EMPLOYING PREFETCH TO REDUCE WRITE OVERHEAD

(71) Applicant: INTEL CORPORATION, Santa Clara, CA (US)

(72) Inventors: Rakesh Krishnaiyer, Milpitas, CA (US); Serge Preis, Novosibirsk (RU); Hideki Ido, Sunnyvale, CA (US); Anatoly Zvezdin, Novosibirsk (RU)

(73) Assignee: INTEL CORPORATION, Santa Clara, CA (US)

( * ) Notice: Subject to any disclaimer, the term of this patent is extended or adjusted under 35 U.S.C. 154(b) by 298 days.

(21) Appl. No.: 14/273,649

(22) Filed: May 9, 2014

(65) Prior Publication Data

US 2015/0324292 A1 Nov. 12, 2015

(51) Int. Cl.
*G06F 12/08* (2016.01)
*G06F 12/0862* (2016.01)

(52) U.S. Cl.
CPC .... *G06F 12/0862* (2013.01); *G06F 2212/602* (2013.01); *G06F 2212/621* (2013.01)

(58) Field of Classification Search
CPC .............................. G06F 9/30; G06F 2212/621
See application file for complete search history.

(56) References Cited

U.S. PATENT DOCUMENTS

2007/0156980 A1* 7/2007 Nayyar ............... G06F 12/0831
711/158

| 2013/0297919 A1* | 11/2013 | Kang | G06F 9/30 |
| | | | 712/241 |
| 2014/0164705 A1* | 6/2014 | Corbal | G06F 9/30047 |
| | | | 711/122 |
| 2014/0173203 A1* | 6/2014 | Forsyth | G06F 12/0862 |
| | | | 711/120 |

FOREIGN PATENT DOCUMENTS

WO   WO 2013/095511 A1 *  6/2013

OTHER PUBLICATIONS

Jim Jeffers, James Reinders, Intel Xeon Phi Coprocessor High perfromance programming, 2013, Chapter 5.*

(Continued)

*Primary Examiner* — Ann J Lo
*Assistant Examiner* — Michelle Taeuber
(74) *Attorney, Agent, or Firm* — Grossman, Tucker, Perreault & Pfleger, PLLC

(57) ABSTRACT

The present application is directed to employing prefetch to reduce write overhead. A device may comprise a processor and a cache memory. The processor may determine if data to be written to the cache memory comprises multiple cache lines wherein at least one of the cache lines will be fully written. If the data comprises at least one cache line to be fully written, then the processor may perform a "prefetch" wherein the processor may write dummy data to sections of the cache memory corresponding to the data to be written in full cache lines. The processor may then write actual data to the sections containing the dummy data without the processor first having to verify ownership of the sections. Any remaining data that will not be written in full cache lines may then be written to the cache memory utilizing a standard write transaction.

24 Claims, 3 Drawing Sheets

(56) References Cited

OTHER PUBLICATIONS

Intel, Streaming Store Instructions in the Intel Xeon Phi Coprocessor, 2012, Slide 1.*

Krishnaiyer, Kultursay, Chawla, Preis, Zvezdin, Saito, Compiler-based Data Prefetching and Streaming Non-temporal Store Generation for the Intel Xeon Phi coprocessor, May 20, 2013, All.*

* cited by examiner

US 9,921,966 B2

EMPLOYING PREFETCH TO REDUCE WRITE OVERHEAD

TECHNICAL FIELD

The present disclosure relates to memory access transactions, and more particularly, to preparing memory prior to data being written so as to allow for expedited data write transactions.

BACKGROUND

The advancement of computing technology is spurred on, in large part, by the desire to improve performance. However, performance increases do not always require bigger and faster devices. Enhanced performance may also be derived by improving the way in which operations are performed. For example, during normal operation a processor may read data from, and write data to, a memory in a computing device. In the most basic sense, the performance (e.g., speed) of the read and write transactions may be defined by the speed of the processor and the memory. However, the speed at which these components communicate may also be increased through the introduction of intermediate resources that help to facilitate the interaction. For example, a cache memory may be a smaller and/or faster memory accessible by the processor to store information frequently accessed by the processor. The cache may increase the speed at which operations are performed on the computing device because the processor doesn't have to constantly access the main memory. Instead, needed data may be more quickly accessible from the cache memory.

However, an insatiable desire for increased performance has yielded new opportunities to eke out even more speed. For example, an area where an opportunity for improvement has been identified is the manner in which a processor may interact with a cache memory. Previously, processors including a plurality of cores with each core possibly executing a separate thread that may be writing the same cache memory would have to first determine the owner (e.g., the thread) of particular sections of the cache memory so that data already existing in the cache memory would not become corrupted. Emerging processors are now being equipped with data transactions that allow entire cache-lines of data to be written without first having to verify ownership of the section of cache memory. The use of these new data transactions may substantially increase the rate at which data can be written by a processor to cache memory, and thus, may substantially increase overall system performance. However, at least one impediment to the use of these new data transactions is the rigid conditions that need to exist before the transaction may be used, limiting any performance increase that may be realized.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
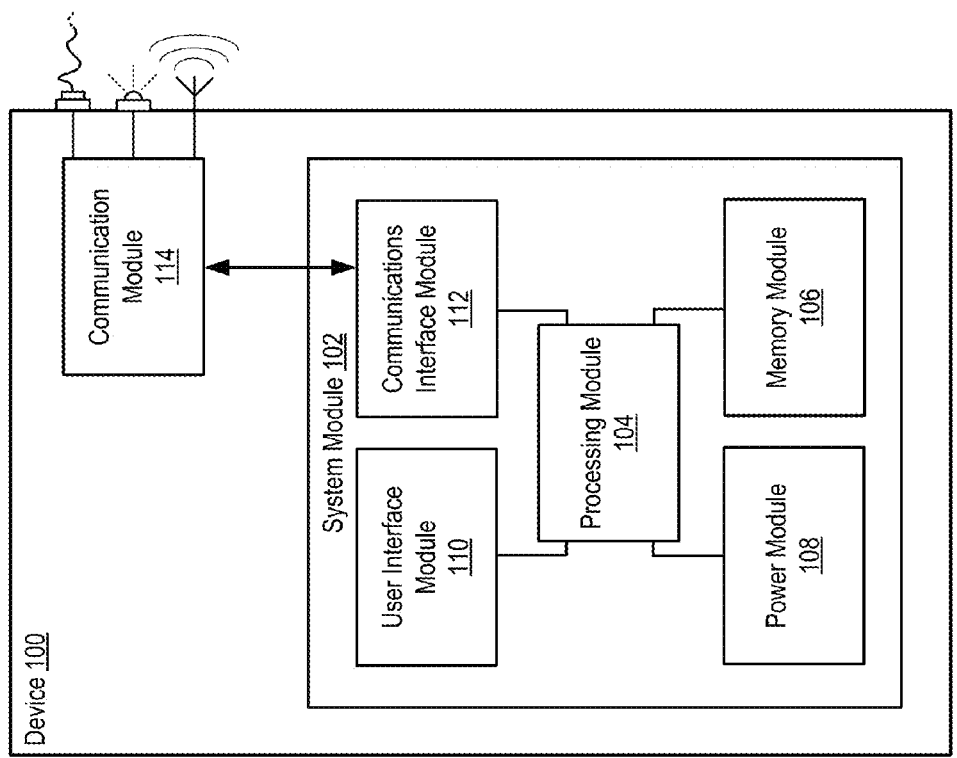
FIG. 1 illustrates an example configuration for a device usable in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present application is directed to employing prefetch to reduce write overhead. In one embodiment, a device may comprise at least a processor and a cache memory to which the processor may write data. During operation, the processor may initially determine if data to be written to the cache memory includes multiple cache lines wherein at least one cache line will be fully written. Each cache-line may have a fixed width (e.g. 64 bytes) and corresponds to a block of memory that starts on an address that is a multiple of the cache-line-width. If the data to be written is determined to comprise multiple cache-lines where not all the cache-lines will be fully written (e.g., the first and last cache-lines are not fully written, but all the middle cache-lines are fully written), then the processor may initially perform a "prefetch" to prepare the cache memory to receive the data. For example, the processor may write dummy data to sections of the cache memory corresponding to the cache-lines that will be fully written. This may be done without the processor first having to verify ownership of the section of the cache memory (e.g., utilizing a read-for-ownership (RFO) transaction). The processor may then proceed to write actual data to the sections of the cache memory containing the dummy data. The omission of the ownership verification may increase data write speed substantially. Any data remaining to be written that may correspond to cache lines that are not fully-written may be written to the cache memory utilizing a standard write operation (e.g., that incorporates the read-for-ownership transaction).

In one embodiment, a processing device may comprise at least a cache memory and a processor. The processor may initially be to determine if data to be written to the cache memory includes data comprising multiple cache lines wherein at least one of the cache lines will be fully written. The processor may further be to prepare sections of the cache memory to receive the data corresponding to the at least one of the cache lines that will be fully written and write at least the data corresponding to the at least one of the cache lines that will be fully written without first determining ownership of the sections of the cache memory.

The processor being to prepare sections of the cache memory may comprise the processor being to write dummy data to the cache memory, the dummy data indicating the sections of the cache memory that will be overwritten with data corresponding to the at least one of the cache lines that will be fully written. For example, the dummy data may be written using an expedited data write transaction, wherein the expedited data write transaction may be performed using a streaming store instruction. The processor may further be to ensure that the dummy data is completely overwritten with the data corresponding to the at least one of the cache lines that will be fully written by adjusting a trip-count of a core-kernel vector loop in the processor to do one less iteration.

In the same or another embodiment, the processor may further be to write any data corresponding to a cache line that will not be fully written using a standard data write transaction. The standard data write transaction may comprise determining ownership of the sections of the cache memory before writing the data corresponding to a cache line that will not be fully written. For example, the ownership of the sections of the cache memory may be determined using a read-for-ownership transaction. A method for employing prefetch to reduce write overhead consistent with the present disclosure may comprise, for example, determining if data to be written to a cache memory includes data comprising multiple cache lines wherein at least one of the cache lines will be fully written, preparing sections of the cache memory to receive the data corresponding to the at least one of the cache lines that will be fully written and writing at least the data corresponding to the at least one of the cache lines that will be fully written without first determining ownership of the sections of the cache memory.

FIG. 1 illustrates an example configuration for device 100 usable in accordance with at least one embodiment of the present disclosure. The various systems, components, methods, etc. disclosed herein may be applicable to a wide range of electronic devices. Device 100 may be, for example, a mobile communication device such as a cellular handset or a smartphone based on the Android® OS from the Google Corporation, iOS® from the Apple Corporation, Windows® OS from the Microsoft Corporation, Mac OS® from the Apple Corporation, Tizen OS™ from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Regardless, device 100 has been provided only as a general example of an apparatus on which embodiments consistent with the present disclosure may be configured, and is not meant to limit these various embodiments to any particular manner of implementation.

Device 100 may comprise, for example, system module 102 configured to manage device operations. System module 102 may include, for example, processing module 104, memory module 106, power module 108, user interface module 110 and communication interface module 112. Device 100 may also include communication module 114. While communication module 114 has been shown as separate from system module 200, the example implementation disclosed in FIG. 1 has been provided merely for the sake of explanation. Some or all of the functionality associated with communication module 114 may be incorporated into system module 102.

In device 100, processing module 104 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium®, Xeon®, Itanium®, Celeron®, Atom™, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which processing module 104 may interact with other system components that may be operating at different speeds, on different buses, etc. in device 100. Some or all of the functionality commonly associated with the support circuitry may also be included in the same physical package as the processor (e.g., such as in the Sandy Bridge family of processors available from the Intel Corporation).

Processing module 104 may be configured to execute various instructions in device 100. Instructions may include program code configured to cause processing module 104 to perform activities related to reading data, writing data, processing data, formulating data, converting data, transforming data, etc. Information (e.g., instructions, data, etc.) may be stored in memory module 106. Memory module 106 may comprise random access memory (RAM) or read-only memory (ROM) in a fixed or removable format. RAM may include volatile memory configured to hold information during the operation of device 100 such as, for example, static RAM (SRAM) or Dynamic RAM (DRAM). ROM may include non-volatile (NV) memory modules configured based on BIOS, UEFI, etc. to provide instructions when device 100 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Discs™, etc.

Power module 108 may include internal power sources (e.g., a battery, fuel cell, etc.) and/or external power sources (e.g., electromechanical or solar generator, power grid, fuel cell, etc.), and related circuitry configured to supply device 100 with the power needed to operate. User interface module 110 may include hardware and/or software to allow users to interact with device 100 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 110 may be incorporated within device 100 and/or may be coupled to device 100 via a wired or wireless communication medium.

Communication interface module 112 may be configured to manage packet routing and other control functions for communication module 114, which may include resources configured to support wired and/or wireless communications. In some instances, device 100 may comprise more than one communication module 114 (e.g., including separate physical interface modules for wired protocols and/or wireless radios) all managed by a centralized communication interface module 112. Wired communications may include serial and parallel wired mediums such as, for example, Ethernet, Universal Serial Bus (USB), FireWire®, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-Range® wireless mediums (e.g., Bluetooth®, WLAN, Wi-Fi, etc.), long range wireless mediums (e.g., cellular wide-area radio communication technology, satellite-based communications, etc.) or electronic communications via sound waves. In one embodiment, communication interface module 112 may be configured to prevent wireless communications that are active in communication module 114 from interfering with each other. In performing this function, communication interface module 112 may schedule activities for communication module 114 based on, for example, the relative priority of messages awaiting transmission. While the embodiment disclosed in FIG. 1 illustrates communication interface module 112 being separate from communication module 114, it may also be possible for the functionality of communication interface module 112 and communication module 114 to be incorporated within the same module.

Figure 2:
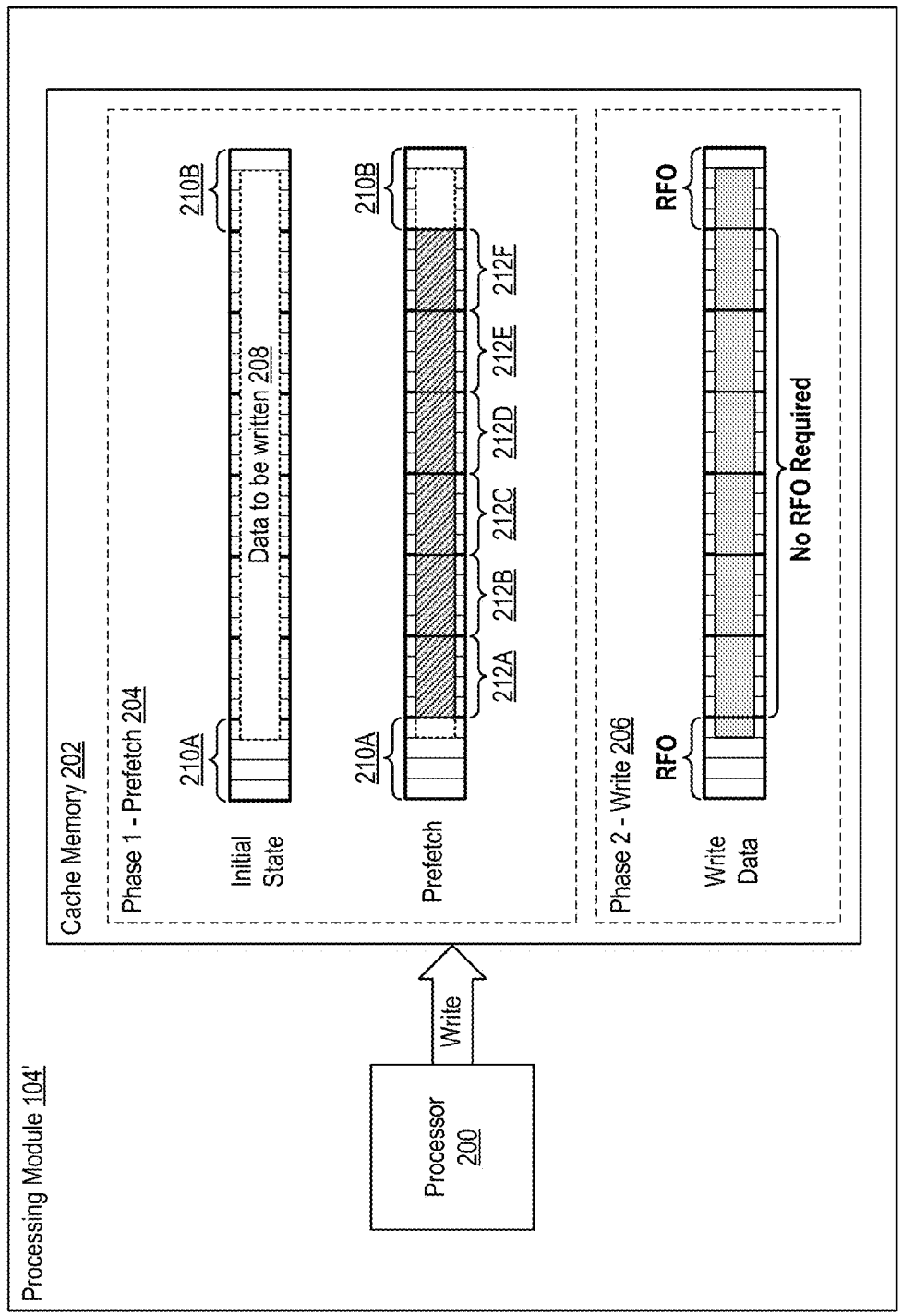
FIG. 2 illustrates an example processing module employing prefetch to reduce write overhead in accordance with at least one embodiment of the present disclosure.

FIG. 2 illustrates example processing module 104' employing prefetch to reduce write overhead in accordance with at least one embodiment of the present disclosure. Processing module 104' may comprise at least one processor 200 configured to at least write data to cache memory 202. For example, a process thread being executed by a core within processor 200 may need to store data that may be required later in the process. Storing data in cache memory 202, as opposed to storing it in memory module 106, facilitates quick access to the data when needed by the process thread. As referenced herein, a "standard" write by processor 200 to cache memory 202 requires that the thread first determine ownership of the memory space to which the data will be written. For some processors (e.g., processors produced by the Intel Corporation) the RFO transaction performs this function. While the RFO transaction is effective for managing how multiple process threads access cache memory 202, it does negatively impact the speed of the write, which may in turn negatively impact the overall processing performance of device 100.

Write transactions that do not require RFO may save memory bandwidth (e.g., such as streaming store instructions (SSIs) available in some Intel processors), but such transactions can be used typically only in cases where the data is aligned at cache-line boundaries. For data to be writable using SSIs the data must be, for example, contiguous, fully writable using a single SSI, fit fully in one cache line and unmasked (e.g., the write must not leave any parts of the cache line unwritten). In many real-life applications, aligning data is difficult. A loop in a programmatic data write structure may comprise multiple array accesses that have different relative alignment, making it impossible to align all of the data to be written at the same time. In many cases, an application may have to be completely restructured to make sure that initial array accesses at the start of each hot loop (e.g., a loop where a large amount of execution time is spent) are properly aligned. If a loop belongs to a parallel region, an alignment property (e.g., for each process thread) may depend on the work-partitioning done by a parallel runtime library (e.g., such as OpenMP runtime provided by the Intel Corporation), and alignment may not be guaranteed irrespective of the preparatory work-partitioning done in the application. In many data access patterns in hot loops, even if the data accessed is actually contiguous, the instructions used for storing data may be strided or masked, which make the use of streaming-store instructions not possible for such stores. This reduces the applicability of streaming-store instructions for use in vector loops and scalar-loops that store data.

Some compilers may be able to mitigate situations where data is not aligned at the cache boundaries by doing some optimizations to get data aligned. For example, the compiler may do dynamic peeling of vector-loops to align some memory references. A vector-kernel loop that follows the peel loop may then take advantage of proper alignment for the array accesses that were targeted by the compiler. Since the compiler has to generate multiple versions of the kernel loop to handle such cases, this technique usually works on only a few (e.g., one or two) memory references per loop. As a result, this technique may lose its efficiency if the loop has a lot of memory references. Moreover, this technique cannot get all accesses aligned if arrays accessed together inside of a loop have different relative alignment. The dynamic peeling heuristics may prefer aligning some loads inside the loop. In that case, there may be unaligned stores even for cases where there are only one or two stores inside the loop. If conditions exist inside the loop, and the same array-elements get written under all conditions, then the compiler may generate masked-stores (e.g., in instances where the compiler couldn't do the optimization to generate a single unmasked store instead of multiple masked stores with complementary predicates). It is important to note that the compiler has to treat all accesses as unaligned by default, unless it can prove that the accesses are aligned based on heuristics in the compiler or based on external hints (e.g., via "pragmas" directives, clauses, etc. defined in the particular programming language that is used) that can convey additional information to the compiler such as alignment information. However, providing such external information requires specifying directives or clauses that often necessitate program restructuring, which can be a laborious process for real-life applications.

Consistent with the present disclosure, compiler techniques are provided to improve write speed by employing SSIs to perform a "streaming-store-prefetch" when the data is not aligned at cache-line boundaries, when the alignment of the data to be written is unknown to the compiler, etc. As referenced herein, "prefetch" indicates a process by which at least part of the memory to receive data may be prepared to receive the data prior to writing. This preparation may increase data write speed, and in turn the overall operational speed of device 100. In one embodiment, a compiler may insert prefetches into a programmatic loop to write data to cache memory 200, the prefetches taking the form of at least one SSI. Regular unaligned vector (or scalar) stores remain inside the loop. The compiler may further be configured to make sure that any cache-line that is prefetched using a SSI also gets written using the standard write transactions in later iterations of the loop. This provides bandwidth benefits for the prefetched cache-lines since RFO is avoided. The compiler may be configured to do this optimization only where the later regular stores will write all elements of the cache-line.

An example of a SSI-based prefetch is disclosed in FIG. 2. In general, processor 200 has data to write to cache memory 202. The write may be performed in two phases: prefetch phase 204 and write phase 206. During prefetch phase 204, at least one section of cache memory 202 may be prepared to receive data to be written 208. Cache memory 202 may be separated into cache-lines, wherein each cache line is the same amount of space (e.g., four sixteen-byte sections totaling 64 bytes). An example cache line is illustrated at 210A. A determination may then be made prior to writing data 208 to cache memory 202 (e.g., when the memory is in an "initial state" as shown in FIG. 2) as to whether any of the data to be written will be cache-aligned (e.g., as to whether any of the data will be contiguous, unmasked and/or will fully overwrite the cache line). As shown at 210A and 210B, two cache lines will not be fully written, and thus, will have to be written using a standard transaction (e.g., using RFO). The remainder of data 208 is writable in entire cache lines, and can be prefetched. During prefetch, dummy data may be written to each cache line that will be fully overwritten, which is shown at cache line 212A, 212B, 212C, 212D, 212E and 212F (collective, "cache lines 212A-F"). The prewriting of dummy data may be deemed a "hit" to cache lines 212A-F, and thus, RFO would not be required when rewriting with data 208. This can be seen during write phase 206 wherein data 208 is written. Due to the previous hit status of cache lines 212A-F, no RFO is required during the writing of data to these cache lines. Instead, RFO is only required when writing to cache lines 210A and 210B because the cache line is not being totally overwritten. The reduced RFO requirement may substantially increase write speed.

Consistent with the present disclosure, the various embodiments presented herein may be most-readily applicable to computing architectures that provide: a) SSIs to write full cache-lines; b) The SSIs have an alignment requirement that makes them usable only when the data access is fully aligned; c) The SSIs offer bandwidth benefits by avoiding RFO; and d) Standard data write operations are available for data that target the same cache lines previously written by an SSI (e.g., non-SSIs that span the full cache-line targeted by the streaming-store-prefetch) after the SSIs (e.g., for the cache-line-split data) and still get the bandwidth benefit of avoiding RFO. For example, at least one embodiment has been tested on the first generation of the Xeon Phi™ coprocessor from the Intel Corporation, a platform that satisfies all of these conditions.

SSIs may typically only be employed in cases where the entirety of the data to be written is aligned at cache-line boundaries. Also, the data to be written must typically be unit-strided (e.g., accessing contiguous sections of memory), and thus, cannot be masked or strided. These requirements severely limit the situations where SSIs can be used to improve bandwidth for real applications. The embodiments disclosed herein use SSIs as a "prefetch," that may extend the applicability of such instructions to the following additional cases that occur frequently in real applications: a) Handling multiple unaligned unit-strided unmasked stores inside a streaming vector-loop; b) Handling unit-strided masked stores inside a streaming vector-loop where the compiler can prove that the full cache-line gets stored irrespective of the masking; c) Handling non-unit-strided stores inside a streaming vector-loop where the compiler can prove that the full cache-line gets stored; and d) Hybrids of a, b, c above. The ability to accommodate these additional operational scenarios may greatly increase the usability of SSIs, and thus, increase data write performance.

Through experimentation, several examples have been observed wherein a compiler will insert SSI-prefetches into a data write loop consistent with the present disclosure. Performance gains apply mostly to loops from bandwidth-bound applications, and improvements in the range of 5-20% have been realized on bandwidth-bound workloads wherein the data to be written is unaligned in hot loops. For example, the Xeon Phi™ coprocessor may include SSIs such as "VMOVNRNGOAPS/VMOVNRNGOAPD." These SSIs are designed to increase performance for vector-aligned unmasked stores in streaming kernels by avoiding a situation wherein memory bandwidth is wasted by having to read the entire original content of a cache line from memory when the content is going to be overwritten completely. For example, compilers may generate SSIs when the loop can be vectorized to generate an aligned unit-strided vector unmasked store.

Following are some more specific examples of how streaming-store-prefetch may operate consistent with the present disclosure. The first example pertains to handling multiple unaligned unit-strided unmasked stores inside a streaming vector loop. Existing compilers (e.g., compilers provided by the Intel Corporation) may be capable of performing dynamic peeling (e.g., breaking a source (src) loop into multiple loops for a few iterations of the original loop until the candidate memory-access gets aligned), alignment versioning, etc. to align up to two unaligned memory references per loop. For example, stores are typically given preference over loads on the Xeon Phi™ coprocessor to enable the generation of SSIs. The compiler may perform peeling to align one access and generate a check to see if a second reference has the same relative alignment as the first access for which dynamic peeling was performed. A remainder loop may also be generated to execute any remaining iterations of the original scalar loop (e.g., if a trip-count of the vectorized loop is not a multiple of the vector length). Example code may appear as follows:

```
void doit3(int n1, float * restrict a, float * restrict b, float * restrict c)
{
int i;
#pragma vector nontemporal
        for (i=0; i<n1; i++) {
                a[i] = -1; // Unaligned in all versions
                b[i] = -2; // Dynamic peel targeting b[i], alignment
                versioning targeting
                c[i]
                c[i] = -3;
        }
}
```

Utilizing the dynamic peeling and alignment versioning optimizations, a compiler (e.g., without applying the proposed streaming-store-prefetch) may generate two streaming-store instructions in the highest optimized version of the core kernel vectorized loop for b[i] and c[i] stores. The store to a[i] may be done using a pair of standard unaligned store instructions:
    vpackstoreld %zmm2, (%rsi,%r11,4)
    vpackstorehd %zmm2, 64(%rsi,%r11,4)
An example core vectorized loop is shown below:

```
..B1.14:       #Preds ..B1.14 ..B1.13 Latency 17
    vpackstoreld %zmm2, (%rsi,%r11,4)        #9.7 c1
    vprefetche1 512(%rsi,%r11,4)              #9.7 c1
    vpackstorehd %zmm2, 64(%rsi,%r11,4)      #9.7 c5
    movb %al, %al                             #10.7 c5
    vmovnrngoaps %zmm1, (%rdx,%r11,4)        #10.7 c9
    vprefetche0 256(%rsi,%r11,4)              #9.7 c9
    vmovnrngoaps %zmm0, (%rcx,%r11,4)        #11.7 c13
    addq $16, %r11                            #8.5 c13
    cmpq %r8, %r11                            #8.5 c17
    jb    ..B1.14 # Prob 99%                  #8.5 c17
```

Note the two vmovnrngo instructions corresponding to b[i] and c[i] above. Consistent with the present disclosure, a compiler may generate at least one vmovnrngo SSI for a[i] as a prefetch. The SSI will target the store that will happen in the next vector iteration of the loop. And the compiler guarantees that any cache line that is streaming-storeprefetched will actually be completely stored-to later in the core-kernel loop or in the remainder loop. This may be done by adjusting the trip-count of the core-kernel vector-loop to do one less iteration as compared to the original loop. This may increase the number of iterations executed inside the remainder loop, but also guarantee that there will be no situation where dummy data written by the streaming-store-prefetch is not later overwritten through compiler generated code.

```
..B1.14:      #Preds ..B1.14 ..B1.13 Latency 29
    lea (% rsi, % r10,4), %r8          #9.7 c1
    andq $-64, %r8                     #9.7 c5
    vmovnrngoaps %zmm0, 64(%r8)        #9.7 c9
    movb %al, %al                      #9.7 c9
    vpackstoreld %zmm3, (%rsi,%r10,4)  #9.7 c13
    vpackstorehd %zmm3, 64(%rsi,%r10,4) #9.7 c17
    movb %al, %al                      #10.7 c17
    vmovnrngoaps %zmm2, (%rdx,%r10,4)  #10.7 c21
    movb %al, %al                      #11.7 c21
    vmovnrngoaps %zmm1, (%rcx,%r10,4)  #11.7 c25
    addq $16, %r10                     #8.5 c25
    cmpq %rbx, %r10                    #8.5 c29
jb          ..B1.14 # Prob 99%         #8.5 c29
```

The first non-globally ordered (ngo) store in the sequence above is the streaming-store prefetch issued for a[i] which is later overwritten. This over-write of the entire cache line (e.g., targeted by the streaming-store-prefetch instruction) will be completed in the next vectorized iteration of the loop for all alignment combinations using the vpackstore ld/hd pair (e.g., except possibly for the last vector iteration). The cache line for the streaming-store-prefetch targeted by the last iteration of the kernel loop will be overwritten completely as part of the remainder-loop execution (e.g., as ensured by the trip-count adjustment). It is important to note that techniques consistent with the present disclosure may lead to the generation of ngo stores for all three array accesses in all versions of the core vector kernel loop, which avoids RFO for all three accesses inside the kernel loops. The optimization may be performed irrespective of whether or not the compiler decides to do dynamic-peeling for some memory references. While this technique is disclosed utilizing a vectorized loop, the transformation itself is applicable even if the loop is not vectorized by the compiler. For example, the compiler may perform an iteration-space split optimization to create a "kernel" loop and a "remainder"

loop from the original loop. The last few iterations of the original loop may get peeled off to execute in the remainder loop. A loop-count adjustment can also be done for the kernel/remainder loop (e.g., as done for the vector case above) to ensure that the entire cache line targeted by the streaming-store-prefetch issued in the kernel loop is overwritten through standard store instructions later (e.g., either in the kernel loop or in the remainder loop).

The overhead from this technique may come from two sources. Initially, there may be an increased number of instructions inside the core kernel loop for each unaligned store. In the above vector example there are three extra instructions ("lea," "andq," and "ngo-store") for each such store. For applications bound by bandwidth, the gains in number of cycles from avoiding the RFO is typically much more than the cost of these extra instructions. Moreover, the core kernel vector loop may execute one less iteration, while the remaining iterations (after execution of the core kernel vector loop) get executed in a remainder loop that is typically less efficient. However, the overhead in this scenario is also small in many application hot-spots, especially if the trip-count of the loop (e.g., executed by one thread) is large enough that most of the time is spent in the core kernel loops as opposed to the remainder/peel loops.

Embodiments consistent with the present disclosure may be applied only in cases where it can be guaranteed that no other thread is waiting to read the cache lines written by the current thread for synchronization purposes. However, this may not be a substantial concern since most application code uses better techniques for synchronization across threads. In one embodiment, this optimization may be enabled only through an external option (e.g., specified by the user). The option semantics may assert that the compiler does not have to worry about intervening reads to same memory locations targeted by the SSIs from a different thread before the current thread has finished execution of such a loop.

In another example implementation, unmasked unit-stride accesses may benefit from the proposed compiler optimization technique. Below is provided a Fortran real-life application example showing large number of unaligned stores inside a streaming vector-loop:

```
!DIR$ vector nontemporal
    do k=1,nz-1
        rhsu(k,1) = cs(1,ipn)*u(k ,ipp1)+sn(1,ipn)*v(k ,ipp1) - u(k,ipn)
        rhsu(k,2) = cs(2,ipn)*u(k ,ipp2)+sn(2,ipn)*v(k ,ipp2) - u(k,ipn)
        rhsu(k,3) = cs(3,ipn)*u(k ,ipp3)+sn(3,ipn)*v(k ,ipp3) - u(k,ipn)
        rhsu(k,4) = cs(5,ipn)*u(k ,ipp5)+sn(5,ipn)*v(k ,ipp5) - u(k,ipn)
        rhsu(k,5) = cs(2,ipn)*u(k+1,ipp2)+sn(2,ipn)*v(k+1,ipp2) - u(k,ipn)
        rhsu(k,6) = cs(3,ipn)*u(k+1,ipp3)+sn(3,ipn)*v(k+1,ipp3) - u(k,ipn)
        rhsu(k,7) = cs(4,ipn)*u(k+1,ipp4)+sn(4,ipn)*v(k+1,ipp4) - u(k,ipn)
        rhsu(k,8) = cs(n,ipn)*u(k+1,ippn)+sn(n,ipn)*v(k+1,ippn) - u(k,ipn)
        rhsu(k,9) = ca4k(k)*u(k,ipn)+ca4p(k)*u(k+1,ipn) - u(k,ipn)
        rhsv(k,1) =-sn(1,ipn)*u(k ,ipp1)+cs(1,ipn)*v(k ,ipp1) - v(k,ipn)
        rhsv(k,2) =-sn(2,ipn)*u(k ,ipp2)+cs(2,ipn)*v(k ,ipp2) - v(k,ipn)
        rhsv(k,3) =-sn(3,ipn)*u(k ,ipp3)+cs(3,ipn)*v(k ,ipp3) - v(k,ipn)
        rhsv(k,4) =-sn(5,ipn)*u(k ,ipp5)+cs(5,ipn)*v(k ,ipp5) - v(k,ipn)
        rhsv(k,5) =-sn(2,ipn)*u(k+1,ipp2)+cs(2,ipn)*v(k+1,ipp2) - v(k,ipn)
        rhsv(k,6) =-sn(3,ipn)*u(k+1,ipp3)+cs(3,ipn)*v(k+1,ipp3) - v(k,ipn)
        rhsv(k,7) =-sn(4,ipn)*u(k+1,ipp4)+cs(4,ipn)*v(k+1,ipp4) - v(k,ipn)
        rhsv(k,8) =-sn(n,ipn)*u(k+1,ippn)+cs(n,ipn)*v(k+1,ippn) - v(k,ipn)
        rhsv(k,9) = ca4k(k)*v(k,ipn)+ca4p(k)*v(k+1,ipn) - v(k,ipn)
    enddo
```

The loop may be manually marked as streaming using a nontemporal directive, but the alignment of the accesses is still unknown. Without streaming-store-prefetch optimization, the compiler can generate ngo-stores for only up to two of the eighteen stores inside this loop. With streaming-storeprefetch, the compiler may be able to generate ngo-stores for all eighteen stores. This increase in ngo stores may achieve significant bandwidth savings (e.g., assuming the data is not already in caches and is truly streaming from memory).

Another example employs OpenMP to show a set of unaligned stores inside a streaming vector-loop that is also parallelized. When the parallelization and vectorization happen at the same level-loop in the original source, it makes it difficult to ensure that accesses inside such a loop are aligned even if dynamic data is assured to be aligned at allocation time and that pointer arguments (a, b, c, d, e) are aligned on entry into the function. Example code may comprise:

```
float foo1(float *restrict a, float *restrict b, float *restrict e, float *c,
float *d, int n)
{
    float s1=0;
#pragma omp parallel for
    for( int i=0; i<n; ++i ) {
        a[i] = c[i] + d[i];
        b[i] = c[i] - d[i];
        e[i] = c[i] * d[i];
    }
    return s1;
}
```

In the above example, even if the lower-bound of the loop in the original source is well-formed (e.g., such as 0 in C or 1 in Fortran), after work-partitioning, each thread starts with its own lower-bound for the loop. The lower bounds may be determined at runtime based on the OpenMP scheduling type (e.g., static-chunk, static-even, dynamic, guided, etc.), num-threads, etc. However, consistent with the present disclosure, the compiler may target all of the stores in the vectorized loop inside each thread to take advantage of speed increases from avoiding RFO.

In the example above, the applicability of the streaming-store-prefetch technique for a loop-nest parallelized using OpenMP was disclosed. However, various embodiments are equally as applicable to other parallelization methods such as using Cilk™ Plus provided by the Intel Corporation. Below is example code for a hot loop taken from a real-life application program wherein the streaming-store-prefetch optimization was applied to get close to a 10% performance improvement. All 21 stores inside the core kernel vectorized loop could avoid the RFO by using this technique:

```
#pragma omp parallel for
#pragma simd
    for(int index=0;index<size;index++){
        float Sa11, Sa21, Sa31, Sa12, Sa22, Sa32, Sa13, Sa23, Sa33;
        float Sv11, Sv21, Sv31, Sv12, Sv22, Sv32, Sv13, Sv23, Sv33;
        float Su11, Su21, Su31, Su12, Su22, Su32, Su13, Su23, Su33;
        float Ssigma1, Ssigma2, Ssigma3;
        Sa11=Ga11[index];
        Sa21=Ga21[index];
        Sa31=Ga31[index];
        Sa12=Ga12[index];
        Sa22=Ga22[index];
        Sa32=Ga32[index];
        Sa13=Ga13[index];
        Sa23=Ga23[index];
        Sa33=Ga33[index];
    #pragma forceinline recursive
        svd__main__kernel_scalar(
            Sa11, Sa21, Sa31, Sa12, Sa22, Sa32, Sa13, Sa23, Sa33,
            Su11, Su21, Su31, Su12, Su22, Su32, Su13, Su23, Su33,
            Sv11, Sv21, Sv31, Sv12, Sv22, Sv32, Sv13, Sv23, Sv33,
            Ssigma1, Ssigma2, Ssigma3);
        Gu11[index]=Su11;
```

-continued

```
        Gu21[index]=Su21;
        Gu31[index]=Su31;
        Gu12[index]=Su12;
        Gu22[index]=Su22;
        Gu32[index]=Su32;
        Gu13[index]=Su13;
        Gu23[index]=Su23;
        Gu33[index]=Su33;
        Gv11[index]=Sv11;
        Gv21[index]=Sv21;
        Gv31[index]=Sv31;
        Gv12[index]=Sv12;
        Gv22[index]=Sv22;
        Gv32[index]=Sv32;
        Gv13[index]=Sv13;
        Gv23[index]=Sv23;
        Gv33[index]=Sv33;
        Gsigma1[index]=Ssigma1;
        Gsigma2[index]=Ssigma2;
        Gsigma3[index]=Ssigma3;
    }
```

In another example, unit-strided masked stores may be handled inside a streaming vector-loop. In the example code presented below, stores are performed into an aligned array "a1" under multiple complementary predicates:

```
void doit4(int n1, float *restrict a1, float *restrict b1, float *restrict c1)
{
    int i;
    __assume_aligned(a1, 64);
    __assume_aligned(a1, 64);
    __assume_aligned(c1, 64);
    for (i=0; i<n1; i++) {
        if (b1[i] != c1[i]) {
            a1[i] = -1;
        }
        else if (b1[i] > c1[i]) {
            a1[i] = -2;
        }
        else {
            a1[i] = -3;
        }
    }
}
```

For the above example, depending on the compiler estimate of which paths are hot (e.g., conditions likely true) vs. cold (e.g., conditions likely false), the compiler may vectorize the loop using predicates and masked stores. Using masked stores would preclude use of SSIs since SSIs may be issued only for unmasked aligned array locations, unless the compiler can prove that all elements of a1 (e.g., in the loop-range) will be completely overwritten during the execution of the loop (e.g., due to the predicates being complementary and store to "a1" happening similarly in all paths). The above analysis would allow the compiler apply the streaming-store-prefetch to such a loop, wherein a streaming-store-prefetch may be issued for "a1" inside of the kernel loop targeting the next vector iteration. Normal vectorization of the loop may occur by utilizing predicates and masked stores inside of the kernel loop, but there may also be an adjustment of the trip-count of the core-kernel vector loop to do one less iteration as compared to the original, as well as a transfer of the final iteration of the core-kernel vector loop to the remainder loop.

The non-unit-strided stores may then be handled inside a streaming vector-loop. Example code is presented below wherein the stores happen for all field members of the structure where data is accessed using an Array of Structs (AOS). The following example is a common usage model in object-oriented code:

```
typedef struct {
    float x, y, z;
} pos_struct;
void doit5(int n1, pos_struct * a1)
{
    int i;
    for (i=0; i<n1; i++) {
        a1[i].x = -1;
        a1[i].y = -2;
        a1[i].z = -3;
    }
}
```

In the above example, the compiler may vectorize the loop using three strided-store or scatter instructions (e.g., one for each store inside the loop). Use of non-unit-strided masked stores typically precludes use of SSIs on some processors (e.g., the Xeon Phi™ coprocessor) instead of strided-stores since SSIs may be issued only for unmasked unit-strided aligned array locations. However, the compiler may be able to prove that all sub-elements of "a1" are getting written inside the loop, and thus, that entire cache lines are being written to in the loop range. This analysis allows the compiler to apply the streaming-store-prefetch to such a loop by, for example, issuing a streaming-store-prefetch for each cache-line of a1 inside the kernel loop targeting the next vector iteration, performing normal vectorization of the loop using predicates and masked stores inside the kernel loop and adjusting the trip-count of the core-kernel vector-loop and the remainder loop in such a fashion that any cache line written to using a streaming-store-prefetch instructions in the kernel loop gets overwritten using a strided-store (or scatter) instruction later in the kernel or remainder loop. Hybrids of these operations are also possible.

Consistent with the present disclosure, the compiler may apply streaming-store-prefetch to loops that have a combination of unit-strided and strided and masked (aligned and unaligned) accesses if the compiler analysis can prove that any cache-line that is touched inside the loop will be completely written-to and the iterations can be adjusted for the kernel and remainder loops to ensure that any cache line written to using a streaming-store-prefetch in the kernel loop will be overwritten later.

Figure 3:
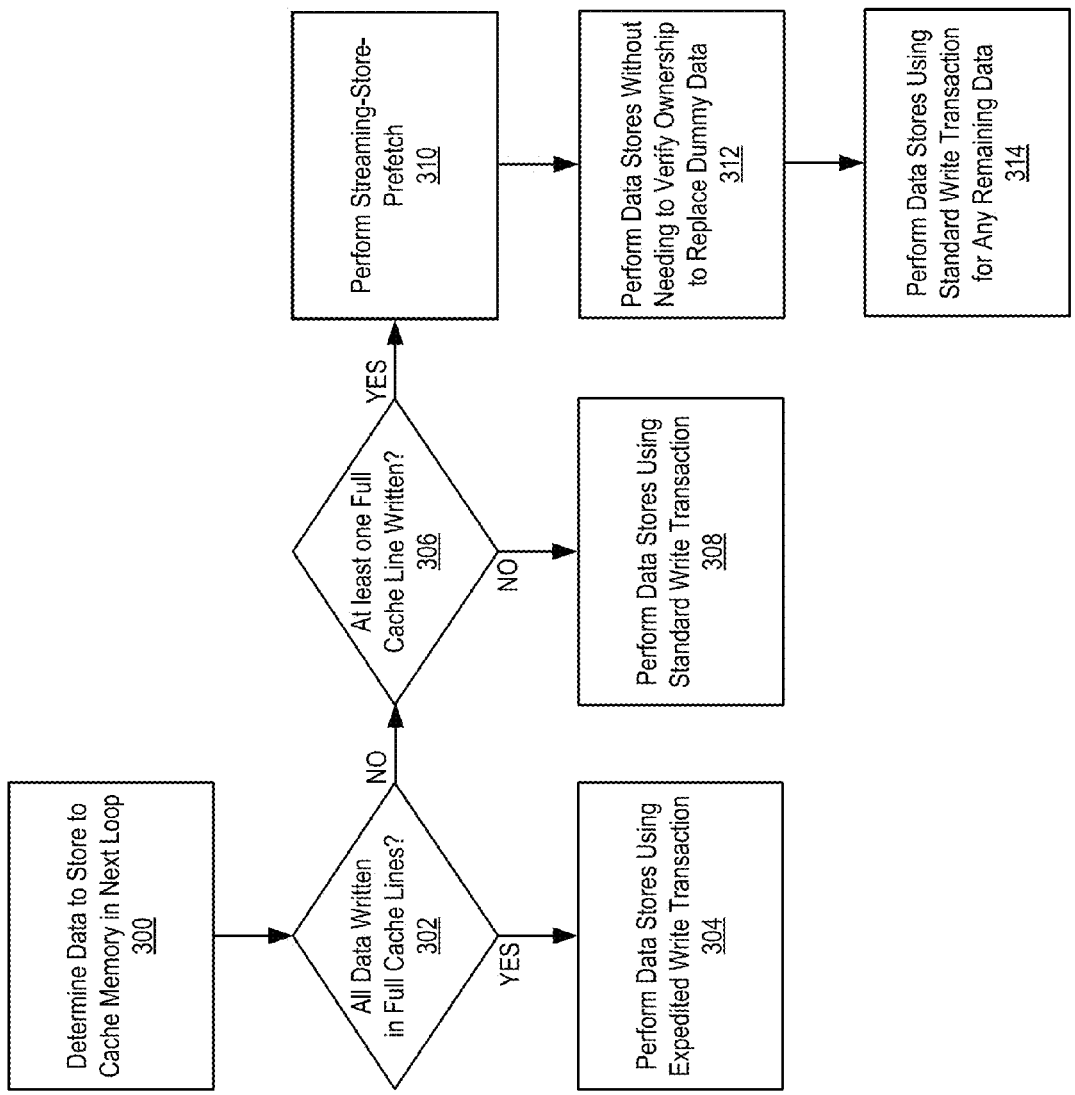
FIG. 3 illustrates example operations for employing prefetch to reduce write overhead in accordance with at least one embodiment of the present disclosure.

FIG. 3 illustrates example operations for employing prefetch to reduce write overhead in accordance with at least one embodiment of the present disclosure. Initially, data to store to cache memory may be determined in operation 300. For example, for each nontemporal store candidate inside a potentially bandwidth bound loop that is not able to use the streaming-store instruction for performing the store, check if the store instructions, which may be unaligned, masked, strided, or scattered, can be proved to store entire cache-lines across multiple iterations of the loop. A determination may then be made in operation 302 as to whether all of the data may be written in full cache lines (e.g., based on the results of operation 300). If in operation 302 it is determined that all of the data may be written in full cache lines, then in operation 304 the data stores may be performed using expedited write transactions (e.g., utilizing SSIs). If in operation 302 it is determined that not all of the data may be written in full cache lines, then in operation 306 a further determination may be made as to whether at least one full cache line may be written. If in operation 306 it is determined that none of the data may be written in full cache lines, then in operation 308 the data may be stored utilizing standard write transactions (e.g., store operations that first require a RFO prior to being able to write the data).

If in operation 306 it is determined that at least one full cache line may be written, then streaming-store-prefetch may be performed in operation 310. The streaming-store-prefetch may include, for example, restructuring a loop (e.g., iteration space) into kernel and remainder loops in a manner that guarantees that all elements of any cache line touched by such a candidate in the kernel loop (e.g., as defined in the above list corresponding to operation 300) will get completely overwritten by other store instructions later in the kernel loop or the remainder loop. Streaming-store-prefetches (e.g., using SSIs for a future store access) may then be inserted at the top of the kernel loop (e.g., before other stores) for all identified candidates in a manner that guarantees that the streaming-store-prefetch instruction will always get issued before any other stores into that cache line. The inserted commands may then cause dummy data to be written into sections of memory where full cache-lines of data will be written. Streaming-store-prefetch in operation 310 may be followed by operation 312 wherein data stores without the need to verify ownership (e.g., RFO) may be performed to replace the dummy data. Any remaining data may then be stored using standard write transactions (e.g., including the RFO requirement) in operation 314.

While FIG. 3 illustrates operations according to an embodiment, it is to be understood that not all of the operations depicted in FIG. 3 are necessary for other embodiments. Indeed, it is fully contemplated herein that in other embodiments of the present disclosure, the operations depicted in FIG. 3, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present application is directed to employing prefetch to reduce write overhead. A device may comprise a processor and a cache memory. The processor may determine if data to be written to the cache memory comprises multiple cache lines wherein at least one of the cache lines will be fully written. If the data comprises at least one cache line to be fully written, then the processor may perform a "prefetch" wherein the processor may write dummy data to sections of the cache memory corresponding to the data to be written in full cache lines. The processor may then write actual data to the sections containing the dummy data without the processor first having to verify ownership of the sections. Any remaining data that will not be written in full cache lines may then be written to the cache memory utilizing a standard write transaction.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for employing prefetch to reduce write overhead, as provided below.

According to example 1 there is provided a processing device. The processing device may comprise a cache memory and a processor to determine if data to be written to the cache memory includes data comprising multiple cache lines wherein at least one of the cache lines will be fully written, prepare sections of the cache memory to receive the data corresponding to the at least one of the cache lines that will be fully written and write at least the data corresponding to the at least one of the cache lines that will be fully written without first determining ownership of the sections of the cache memory.

Example 2 may include the elements of example 1, wherein the processor being to prepare sections of the cache memory comprises the processor being to write dummy data to the cache memory, the dummy data indicating the sections of the cache memory that will be overwritten with data corresponding to the at least one of the cache lines that will be fully written.

Example 3 may include the elements of example 2, wherein the dummy data is written using an expedited data write transaction.

Example 4 may include the elements of example 3, wherein the expedited data write transaction is performed using a streaming store instruction.

Example 5 may include the elements of example 4, wherein the processor is to cause a compiler in the processing device to insert at least one streaming store instruction into code configured to write the data to the cache memory, the at least one streaming store instruction being to write the dummy data to the sections of the cache memory that will be overwritten with data corresponding to the at least one of the cache lines that will be fully written.

Example 6 may include the elements of example 2, wherein the processor is further to ensure that the dummy data is completely overwritten with the data corresponding to the at least one of the cache lines that will be fully written by adjusting a trip-count of a core-kernel vector loop in the processor to do one less iteration.

Example 7 may include the elements of example 6, wherein the adjustment causes the final iteration of the core-kernel vector loop to be moved to a remainder loop.

Example 8 may include the elements of any of examples 1 to 7, wherein the processor is further to write any data corresponding to a cache line that will not be fully written using a standard data write transaction.

Example 9 may include the elements of example 8, wherein the standard data write transaction comprises determining ownership of the sections of the cache memory before writing the data corresponding to a cache line that will not be fully written.

Example 10 may include the elements of example 9, wherein ownership of the sections of the cache memory is determined using a read-for-ownership transaction.

According to example 11 there is provided a method for employing prefetch to reduce write overhead. The method may comprise determining if data to be written to a cache memory includes data comprising multiple cache lines wherein at least one of the cache lines will be fully written, preparing sections of the cache memory to receive the data corresponding to the at least one of the cache lines that will be fully written and writing at least the data corresponding to the at least one of the cache lines that will be fully written without first determining ownership of the sections of the cache memory.

Example 12 may include the elements of example 11, wherein preparing sections of the cache memory comprises writing dummy data to the cache memory, the dummy data indicating the sections of the cache memory that will be overwritten with data corresponding to the at least one of the cache lines that will be fully written.

Example 13 may include the elements of example 12, wherein the dummy data is written using an expedited data write transaction.

Example 14 may include the elements of example 13, wherein the expedited data write transaction is performed using a streaming store instruction.

Example 15 may include the elements of example 14, and may further comprise causing a compiler to insert at least one streaming store instruction into code configured to write the data to the cache memory, the at least one streaming store instruction being to write the dummy data to the sections of the cache memory that will be overwritten with data corresponding to the at least one of the cache lines that will be fully written.

Example 16 may include the elements of example 12, any may further comprise ensuring that the dummy data is completely overwritten with the data corresponding to the at least one of the cache lines that will be fully written by adjusting a trip-count of a core-kernel vector loop in the processor to do one less iteration.

Example 17 may include the elements of example 16, wherein the adjustment causes the final iteration of the core-kernel vector loop to be moved to a remainder loop.

Example 18 may include the elements of any of examples 11 to 17, and may further comprise writing any data corresponding to a cache line that will not be fully written using a standard data write transaction.

Example 19 may include the elements of example 18, wherein the standard data write transaction comprises determining ownership of the sections of the cache memory before writing the data corresponding to a cache line that will not be fully written.

Example 20 may include the elements of example 19, wherein ownership of the sections of the cache memory is determined using a read-for-ownership transaction.

According to example 21 there is provided a system for employing prefetch to reduce write overhead including at least a device, the system being arranged to perform the method of any of the above examples 11 to 20.

According to example 22 there is provided a chipset arranged to perform the method of any of the above examples 11 to 20.

According to example 23 there is provided at least one machine readable medium comprising a plurality of instructions that, in response to be being executed on a computing device, cause the computing device to carry out the method according to any of the above examples 11 to 20.

According to example 24 there is provided a device configured to employ prefetch to reduce write overhead, the device being arranged to perform the method of any of the above examples 11 to 20.

According to example 25 there is provided a system configured to employ prefetch to reduce write overhead. The system may comprise means for determining if data to be written to a cache memory includes data comprising multiple cache lines wherein at least one of the cache lines will be fully written, means for preparing sections of the cache memory to receive the data corresponding to the at least one of the cache lines that will be fully written and means for writing at least the data corresponding to the at least one of the cache lines that will be fully written without first determining ownership of the sections of the cache memory.

Example 26 may include the elements of example 25, wherein the means for preparing sections of the cache memory comprise means for writing dummy data to the cache memory, the dummy data indicating the sections of the cache memory that will be overwritten with data corresponding to the at least one of the cache lines that will be fully written.

Example 27 may include the elements of example 26, wherein the dummy data is written using an expedited data write transaction.

Example 28 may include the elements of example 27, wherein the expedited data write transaction is performed using a streaming store instruction.

Example 29 may include the elements of example 26, and may further comprise means for ensuring that the dummy data is completely overwritten with the data corresponding to the at least one of the cache lines that will be fully written by adjusting a trip-count of a core-kernel vector loop in the processor to do one less iteration.

Example 30 may include the elements of any of examples 25 to 29, and may further comprise means for writing any data corresponding to a cache line that will not be fully written using a standard data write transaction.

Example 31 may include the elements of example 30, wherein the standard data write transaction comprises determining ownership of the sections of the cache memory before writing the data corresponding to a cache line that will not be fully written.

Example 32 may include the elements of example 31, wherein ownership of the sections of the cache memory is determined using a read-for-ownership transaction.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

All computer software code appearing herein is property of Intel. © 2014 Intel Corporation.

What is claimed:

1. A processing device, comprising:
   a cache memory; and
   a processor to:
   determine if data to be written to the cache memory includes data comprising multiple cache lines wherein at least one of the cache lines will be fully written;
   prepare sections of the cache memory to receive the data corresponding to the at least one of the cache lines that will be fully written; and
   write at least the data corresponding to the at least one of the cache lines that will be fully written without first determining ownership of the sections of the cache memory.

2. The device of claim 1, wherein the processor to prepare sections of the cache memory comprises the processor to write dummy data to the cache memory, the dummy data indicating the sections of the cache memory that will be overwritten with data corresponding to the at least one of the cache lines that will be fully written.

3. The device of claim 2, wherein the dummy data is written using an expedited data write transaction.

4. The device of claim 3, wherein the expedited data write transaction is performed using a streaming store instruction.

5. The device of claim 2, wherein the processor is further to ensure that the dummy data is completely overwritten with the data corresponding to the at least one of the cache lines that will be fully written by adjusting a trip-count of a core-kernel vector loop in the processor to do one less iteration.

6. The device of claim 1, wherein the processor is further to write any data corresponding to a cache line that will not be fully written using a standard data write transaction.

7. The device of claim 6, wherein the standard data write transaction comprises determining ownership of the sections of the cache memory before writing the data corresponding to a cache line that will not be fully written.

8. The device of claim 7, wherein ownership of the sections of the cache memory is determined using a read-for-ownership transaction.

9. A method for employing prefetch to reduce write overhead, comprising:
   determining if data to be written to a cache memory includes data comprising multiple cache lines wherein at least one of the cache lines will be fully written;
   preparing sections of the cache memory to receive the data corresponding to the at least one of the cache lines that will be fully written; and writing at least the data corresponding to the at least one of the cache lines that will be fully written without first determining ownership of the sections of the cache memory.

10. The method of claim 9, wherein preparing sections of the cache memory comprises writing dummy data to the cache memory, the dummy data indicating the sections of the cache memory that will be overwritten with data corresponding to the at least one of the cache lines that will be fully written.

11. The method of claim 10, wherein the dummy data is written using an expedited data write transaction.

12. The method of claim 11, wherein the expedited data write transaction is performed using a streaming store instruction.

13. The method of claim 10, further comprising:
ensuring that the dummy data is completely overwritten with the data corresponding to the at least one of the cache lines that will be fully written by adjusting a trip-count of a core-kernel vector loop in the processor to do one less iteration.

14. The method of claim 9, further comprising:
writing any data corresponding to a cache line that will not be fully written using a standard data write transaction.

15. The method of claim 14, wherein the standard data write transaction comprises determining ownership of the sections of the cache memory before writing the data corresponding to a cache line that will not be fully written.

16. The method of claim 15, wherein ownership of the sections of the cache memory is determined using a read-for-ownership transaction.

17. At least one machine-readable non-transitory storage device having stored thereon, individually or in combination, instructions that when executed by one or more processors result in the following operations for employing prefetch to reduce write overhead, comprising:
determining if data to be written to a cache memory includes data comprising multiple cache lines wherein at least one of the cache lines will be fully written;
preparing sections of the cache memory to receive the data corresponding to the at least one of the cache lines that will be fully written; and
writing at least the data corresponding to the at least one of the cache lines that will be fully written without first determining ownership of the sections of the cache memory.

18. The non-transitory storage device of claim 17, wherein preparing sections of the cache memory comprises writing dummy data to the cache memory, the dummy data indicating the sections of the cache memory that will be overwritten with data corresponding to the at least one of the cache lines that will be fully written.

19. The non-transitory storage device of claim 18, wherein the dummy data is written using an expedited data write transaction.

20. The non-transitory storage device of claim 19, wherein the expedited data write transaction is performed using a streaming store instruction.

21. The non-transitory storage device of claim 18, further comprising instructions that when executed by one or more processors result in the following operations, comprising:
ensuring that the dummy data is completely overwritten with the data corresponding to the at least one of the cache lines that will be fully written by adjusting a trip-count of a core-kernel vector loop in the processor to do one less iteration.

22. The non-transitory storage device of claim 17, further comprising instructions that when executed by one or more processors result in the following operations, comprising:
writing any data corresponding to a cache line that will not be fully written using a standard data write transaction.

23. The non-transitory storage device of claim 22, wherein the standard data write transaction comprises determining ownership of the sections of the cache memory before writing the data corresponding to a cache line that will not be fully written.

24. The non-transitory storage device of claim 23, wherein ownership of the sections of the cache memory is determined using a read-for-ownership transaction.

* * * * *